United States Patent [19]

Tenniswood

[11] Patent Number: 4,844,401
[45] Date of Patent: Jul. 4, 1989

[54] NOISE ISOLATED RELAY

[75] Inventor: David M. Tenniswood, Birmingham, Mich.

[73] Assignee: Hi-Ram, Inc., Detroit, Mich.

[21] Appl. No.: 212,845

[22] Filed: Jun. 29, 1988

[51] Int. Cl.$^4$ ............................................. F16M 13/00
[52] U.S. Cl. ................................................... 248/635
[58] Field of Search ............... 248/635, 634, 638, 610, 248/612, 613, 317, 60, DIG. 4; 335/229

[56] References Cited

U.S. PATENT DOCUMENTS

| | | |
|---|---|---|
| 1,606,966 | 11/1926 | Smith-Clarke . |
| 1,940,686 | 12/1933 | Lord . |
| 1,968,040 | 7/1934 | Houdek . |
| 4,116,411 | 9/1978 | Masuda ................................. 248/60 |
| 4,151,822 | 5/1979 | Miura et al. .................... 248/612 X |
| 4,296,907 | 10/1981 | Ishida et al. .................... 248/610 X |
| 4,326,693 | 4/1982 | Noble . |
| 4,465,252 | 8/1984 | Donovan, Jr. et al. ............... 248/60 |
| 4,638,965 | 1/1987 | DeBruine et al. ............... 248/610 X |

Primary Examiner—Ramon O. Ramirez
Attorney, Agent, or Firm—Edgar A. Zarins; Malcolm L. Sutherland; Leon E. Redman

[57] ABSTRACT

A mounting assembly for securing a control relay in sound isolation to the vehicle chassis to prevent the energizing and de-energizing noise of the relay from being transmitted through the vehicle chassis. The assembly includes a pair of absorbing members which receive a mounting bracket attached to the vehicle chassis and which are seated within a retaining sleeve of the relay housing. The absorbing members prevent contact between the mounting bracket and the relay housing and absorb the noise of the relay to prevent transmission to the vehicle chassis. An abutment flange and a retaining clip on the mounting bracket disposed on opposite sides of the retaining sleeve cooperate with a dividing wall in the retaining sleeve to prevent axial movement of the mounting bracket and absorber members relative to the control relay.

19 Claims, 3 Drawing Sheets

U.S. Patent  Jul. 4, 1989  Sheet 1 of 3  4,844,401
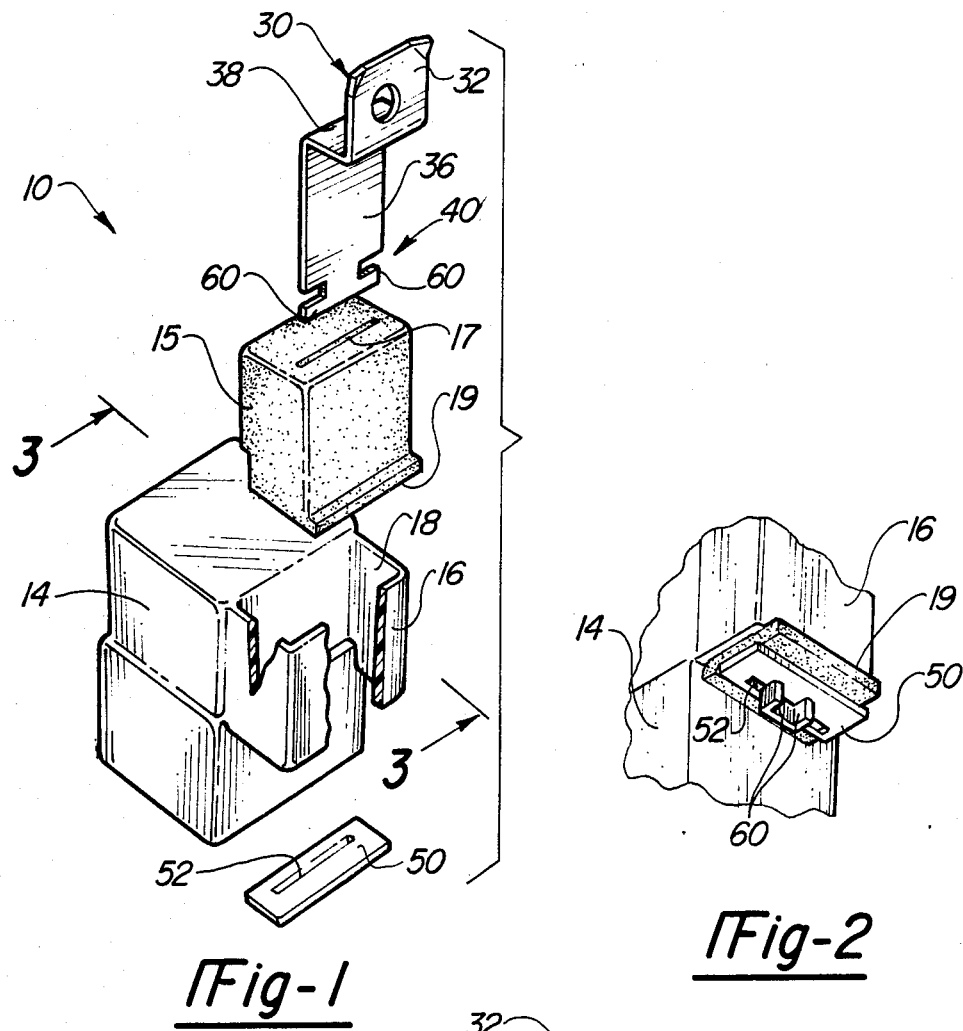
Fig-1
Fig-2
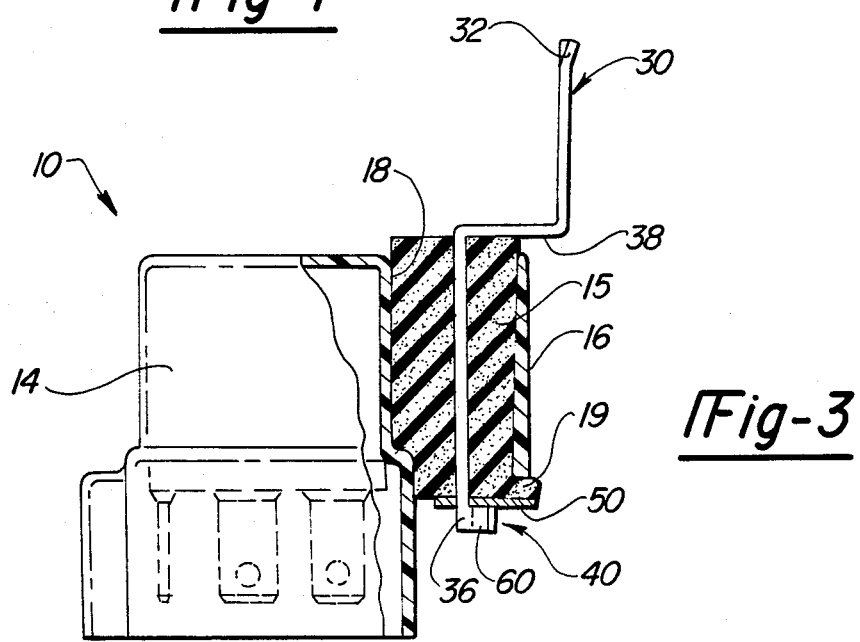
Fig-3

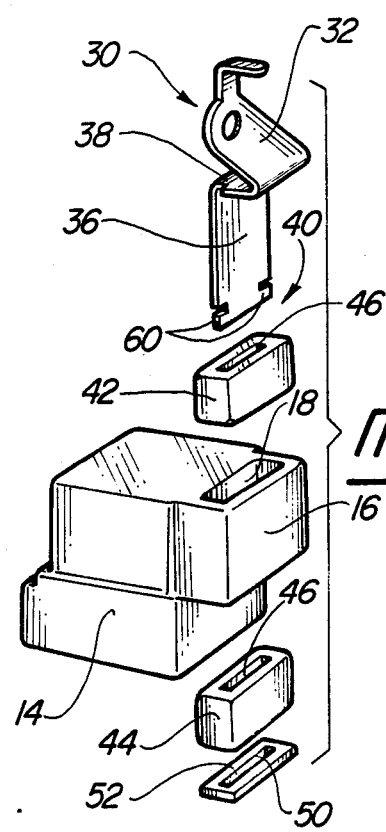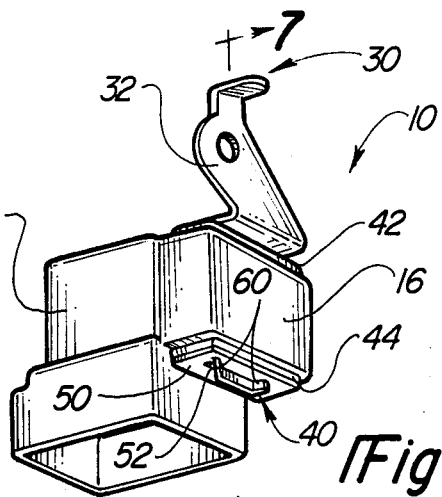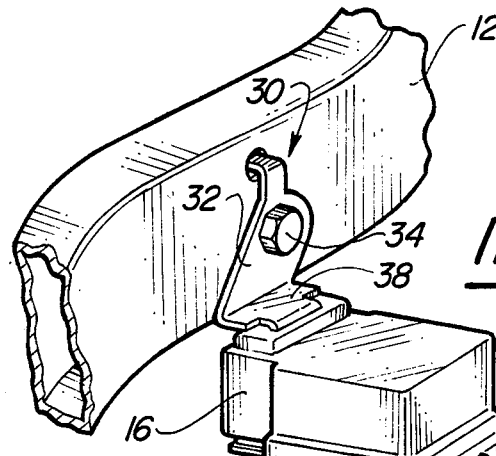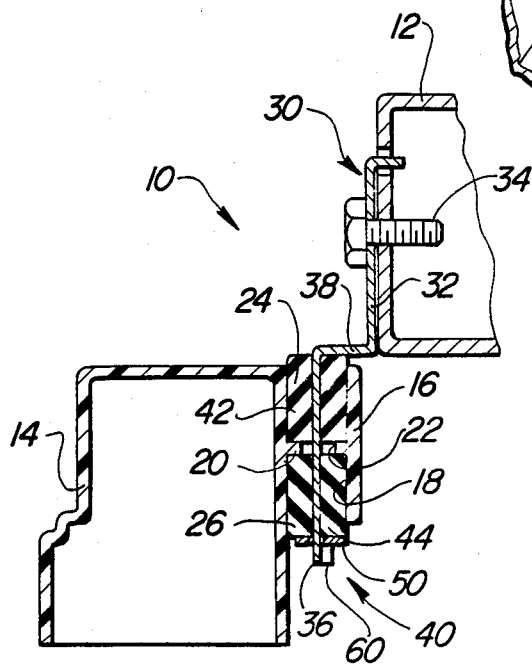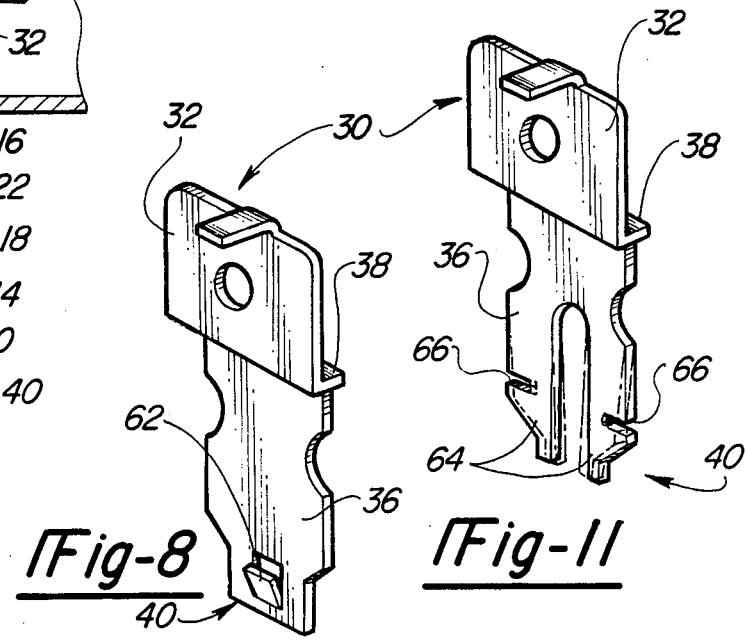

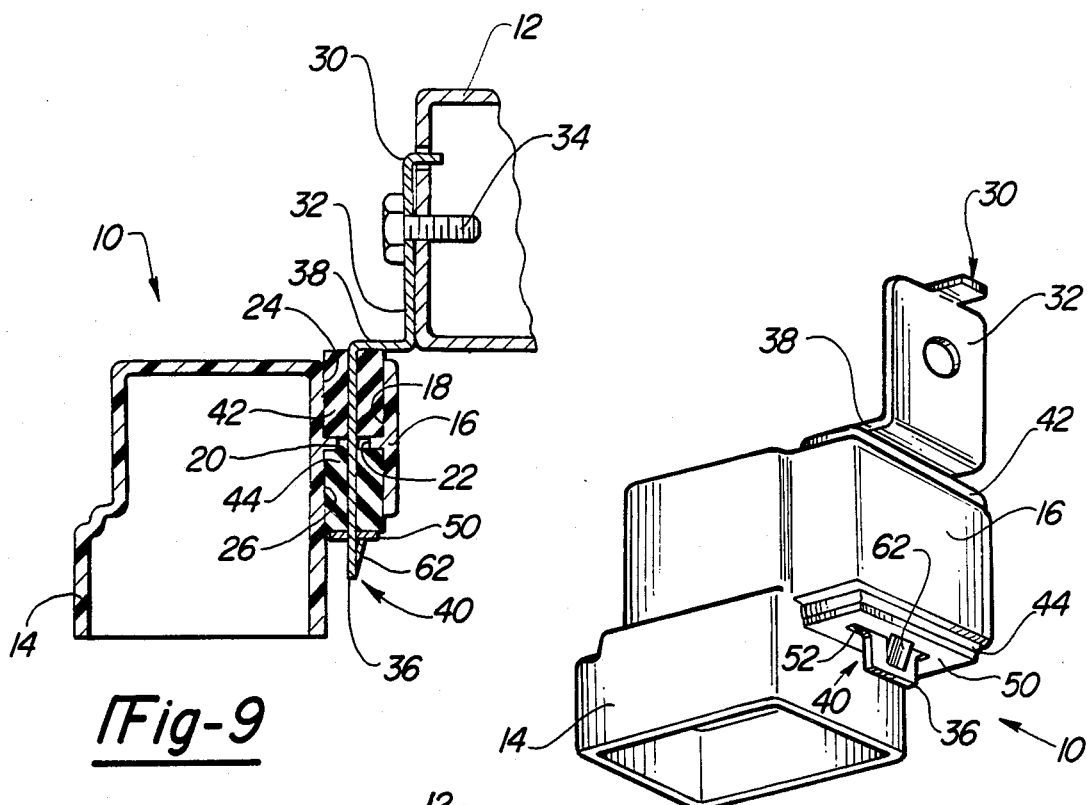
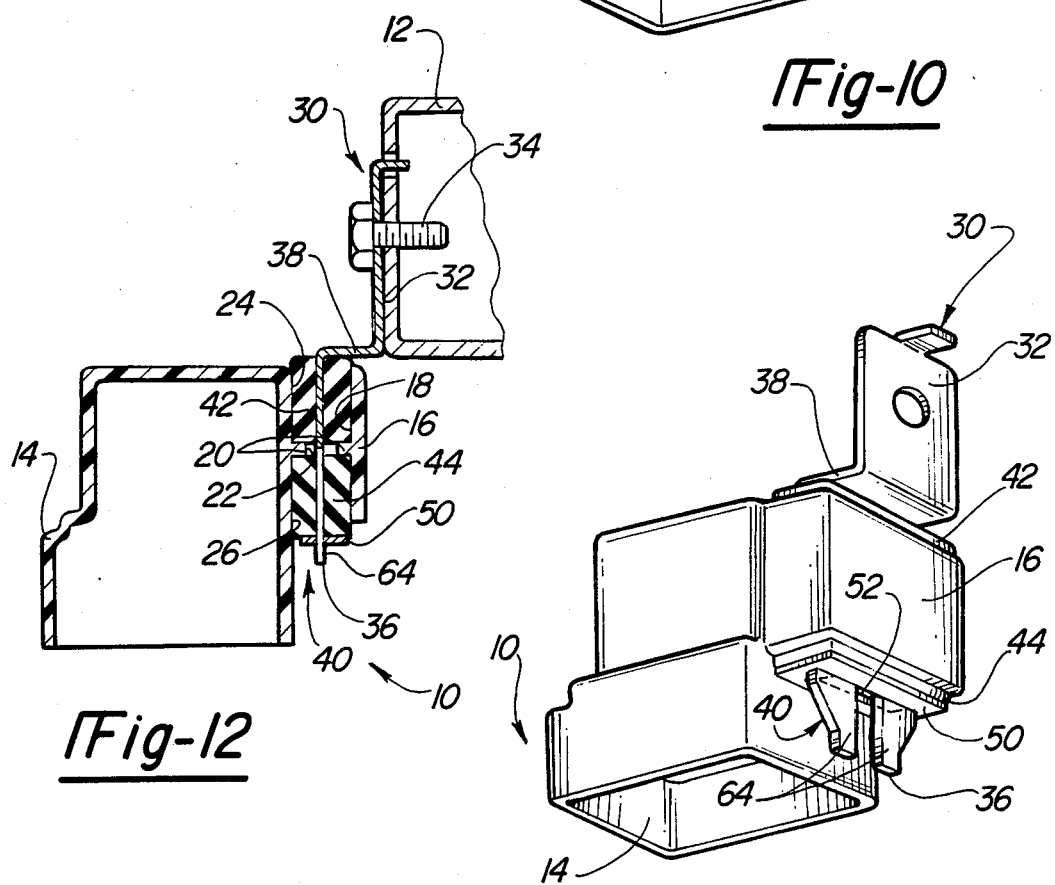

NOISE ISOLATED RELAY

BACKGROUND OF THE INVENTION

I. Field of the Invention

The present invention is directed to a control relay for use in a vehicle assembly and, in particular, to a relay which is isolated from the vehicle chassis to prevent noise of the relay from being transferred into the vehicle chassis.

II. Description of the Prior Art

Control relays are utilized throughout a vehicle construction to control various electrical components such as headlights, windshield wipers, etc. Normally, such relays are mounted directly to the vehicle chassis in the vicinity of the component. Because such relays produce a distinctive "click" when energized and de-energized, the sound from the relay can be transmitted throughout the vehicle chassis. At times, such relay noise can be heard inside the passenger compartment. This is particularly objectionable in luxury cars where engineers strive to reduce noise to a minimum. While passenger compartments are sealed and insulated to eliminate road noise, the relay noise becomes attenuated. Moreover, although the relays are mounted proximate the particular component in past known vehicles, it is anticipated that future vehicles will centralize the component relays and fuses in a load center possibly located within the passenger compartments which will only increase the amount of noise transmitted into the passenger compartment.

SUMMARY OF THE PRESENT INVENTION

The present invention overcomes the disadvantages of the prior control relays used in vehicle assemblies by providing isolation of the relay from the vehicle chassis to which it is mounted.

The relay assembly of the present invention generally includes a mounting bracket adapted to attach the relay assembly to the vehicle assembly. The mounting bracket will be configured according to the chassis component to which it must be attached but will include retaining clip means formed at the remote end thereof. The relay housing is provided with a retaining sleeve adapted to receive at least one rubber absorber in order to isolate the relay from the mounting bracket and vehicle chassis. The rubber absorber is attached to the mounting bracket and positioned within the retaining sleeve. In a further embodiment, the retaining sleeve includes an intermediate dividing wall with a slot configured to receive the end of the mounting bracket which passes through the retaining sleeve. In order to isolate the relay from the mounting bracket and vehicle chassis, a pair of rubber absorbers are attached to the mounting bracket and positioned within the retaining sleeve on opposite sides of the intermediate wall. The relay is attached to the mounting bracket by first passing the end of the bracket through one of the rubber absorbers, through the slot in the intermediate wall of the retaining sleeve, and through the other rubber absorber. The end of the mounting bracket is provided with retaining clip means to prevent removal of the bracket from the rubber absorbers and therefore the retaining sleeve. As a result, the control relay and its housing are isolated from the mounting bracket and the vehicle chassis by the rubber absorbers.

Other objects, features and advantages will be apparent from the following detailed description of the present invention taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an exploded view of a first embodiment of the noise isolated relay of the present invention;

FIG. 2 is a fragmentary perspective of the retaining clip of the, present invention;

FIG. 3 is cross-sectional view of the noise isolated relay of the present invention taken along line 3—3 in FIG. 1;

FIG. is 4 is an elevated perspective of the noise isolated relay embodying the present invention mounted to a chassis component of a vehicle;

FIG. 5 is an exploded view of an alternate embodiment of the noise isolated relay of the present invention;

FIG. 6 is a perspective view of the alternate embodiment of the present invention;

FIG. 7 is a cross-sectional view of the alternate embodiment of the present invention taken along line 7—7 in FIG. 6;

FIG. 8 is a perspective view of a further embodiment of the mounting bracket of the present invention;

FIG. 9 is a cross-sectional view of the noise isolated relay utilizing the mounting bracket of FIG. 8;

FIG. 10 is a perspective view of the noise isolated relay utilizing the mounting bracket of FIG. 8;

FIG. 11 is a perspective view of a still further embodiment of the mounting bracket of the present invention;

FIG. 12 is a cross-sectional view of the noise isolated relay utilizing the mounting bracket of FIG. 8; and FIG. 13 is, a perspective view of the noise isolated relay utilizing the mounting bracket of FIG. 8.

DETAILED DESCRIPTION OF A PREFERRED EMBODIMENT OF THE PRESENT INVENTION

Referring to the drawings, there are shown several embodiments of a control relay assembly 10 adapted to be mounted to a component of a vehicle chassis 12. The relay is of a well known type utilized to control electrical components throughout the vehicle. In the embodiments of the present invention, the relay preferably includes a relay cover or housing 14 molded from plastic or the like.

Referring first to the embodiment of FIGS. 1 through 3, the relay housing 14 is provided with an integrally formed retaining sleeve 16 having a through passageway 18. The relay assembly of FIGS. 1-3 includes an absorber member 15 made of a resilient rubber material and includes a central passageway 17 and retaining lip 19. The absorber member 15 is preferably made of a rubber compound known as "Norsorex" manufactured by J. L. Schroth Co., which has been found to effectively reduce the noise associated with the control relay. The central passageway 17 is configured to receive the bracket by which the relay 10 is mounted to the vehicle chassis 12.

Referring now to the embodiment of FIGS. 4 through 7, the relay housing 14 includes an integrally formed retaining sleeve 16 having a through passageway 18. The sleeve 16 is formed along one wall of the housing 14 and includes an inner dividing wall 20 formed across passageway 18. The wall 20 includes an opening 22 thereby substantially forming an annular shoulder and maintaining the through passageway 18. The inner wall 20 divides the passageway 18 into an upper chamber 24 and a lower chamber 26.

The control relay assembly 10 is mounted to the vehicle chassis 12 using a bracket 30 having a first end 32 adapted to be secured to the chassis 12 using a bolt 34 or the like and a second end 36 adapted to be received within the retaining sleeve 16. Preferably, the first end 32 of the bracket 30 includes an abutment flange 38 formed by a bend in the mounting bracket 30. The second end 36 of the mounting bracket 30 includes retaining clip means 40 which will be described in greater detail hereinafter.

The control relay assembly 10 of FIGS. 4-7 includes a pair of absorber members 42 and 44 which are made of a resilient rubber material and include central passageways 46. The absorber members 42 and 44 are preferably also made of Norsorex rubber manufactured by J. L. Schroth Co. The central passageway 46 is configured to receive the second end 36 of the mounting bracket 30 while the configuration of the absorber members 42 and 44 conforms to the passageway 18 and, in particular, the upper chamber 24 and lower chamber 26 of the passageway 18.

The control relay 10 of the first embodiment is assembled prior to mounting to the vehicle chassis 12 by passing the second end 36 of the mounting bracket 30 through the passageway 17 of the absorber member 15 until the abutment flange 38 engages the top of the absorber member 15. The bracket 30 and absorber member 15 are placed in the retaining sleeve 16 of the housing 14 until the retaining lip 19 extends outwardly from the bottom of the sleeve 16 thereby preventing axial displacement. Similarly, the abutment flange 38 of the bracket 30 prevents axial displacement in the opposite direction. The bracket 30 will be positioned such that retaining clip means 40 extends out the bottom of the absorber member 15 and sleeve 16.

The control relay 10 of FIGS. 4-7 is assembled prior to mounting to the vehicle chassis 12 by passing the second end 36 of the mounting bracket 30 through the passageways 46 of the absorber members 42 and 44 and the opening 22 in the passageway 18. The second end 36 is first passed through the passageway 46 of first absorber member 42 until the upper end of the absorber member 42 engages the abutment flange 38 of the bracket 30. The end 36 of the bracket 30 is passed through the opening 22 in the dividing wall 20 until the first absorber member 42 is seated within the upper chamber 24 of the passageway 18 against the inner dividing wall 20. Second absorber member 44 can now be attached to the bracket 30 by passing the second end 36 of the bracket 30 through the passageway 46 of second absorber member 44 until the retaining clip means 40 extends completely through the absorber member 44. In this position, the second absorber member 44 will be seated within the lower chamber 26 such that the inner wall 20 is disposed between the absorber members 42 and 44. Although the absorber members 42 and 44 fit snugly around the bracket 30, the opening 22 in the wall 20 will be substantially larger than the bracket 30 to prevent any contact between the relay housing 14 and the mounting bracket 30. In this manner, the relay housing 14 and integral retaining sleeve 16 are isolated from the mounting bracket 30 and vehicle chassis 12 by the absorber members 42 and 44, although the relay housing 14 is securely attached to the mounting bracket 30 and therefore the vehicle 12.

The second end 36 of bracket 30 is prevented from being inadvertently withdrawn from the absorber members and the retaining sleeve 16 by retaining clip means 40 formed at the remote end of the bracket 30. Axial displacement of the bracket 30 or the absorber members 42 and 44 in the embodiments of FIGS. 4-11 is prevented by the cooperation of the retaining clip means 40 with the inner dividing wall 20 and the abutment flange 38. Three different embodiments of the retaining clip means 40 are shown in the bracket configurations of FIGS. 2, 5, 8 and 11. However, each configuration of the retaining clip means 40 utilizes a face plate 50 having a slotted aperture 52 adapted to receive the end 36 of the bracket 30. The face plate 50 is retained against the lower end of the absorber members to capture the absorber members within the retaining sleeve 16. In the embodiment of FIGS. 1-3, the absorber 15 is captured between the abutment flange 38 and the face plate 50. The lip 19 of the absorber member 15 and the size of the face plate 50 in cooperation with the abutment flange 38 prevent axial movement of the bracket 30 and absorber relative to the relay housing 14. In the embodiments of FIGS. 4-13, the face plate 50 captures the second absorber member 44 within the lower chamber 26 between the plate 50 and the inner wall 20. Similarly, the first absorber member 42 is captured within the upper chamber 24 between the abutment flange 38 and the inner wall 20.

The retaining clip means 40 of the embodiment of FIGS. 1 through 7 includes a pair of bendable tabs 60. Once the end of the bracket 30 is passed through the slot 52 of the face plate 50, the tabs 60 can be bent so that they engage the face plate 50 and prevent withdrawal of the bracket 30 from the slot 52. The retaining clip means 40 of the embodiment of FIGS. 8 through 10 includes a resilient flange 62 which once passed through the slot 52 of the face plate 50 engages the face plate 50 to prevent withdrawal of the mounting bracket 30. Finally, the retaining clip means 40 of the embodiment of FIGS. 11 through 13 includes a pair of resilient fingers 64 which can be moved inwardly toward each other, as shown in phantom in FIG. 11, to facilitate insertion of the bracket end 36 through the slot 52 of the face plate. Once the end 36 is passed through the slot 52, the fingers 64 will be biased outwardly such that shoulders 66 engage the face plate 50 to prevent withdrawal of the mounting bracket 30. With all three embodiments of the retaining clip means 40, the face plate 50 prevents withdrawal of the bracket 30 while axial displacement of the bracket 30 relative to the relay is prevented. Moreover, the absorber members 42 and 44 are compressible to absorb any loads which may be applied to the relay housing.

The foregoing detailed description has been given for clearness of understanding only and no unnecessary limitations should be understood therefrom as some modifications will be obvious to those skilled in the art without departing from the scope and spirit of the appended claims.

I claim:

1. An assembly for mounting a control relay to a vehicle chassis in sound isolation from the vehicle chassis, said assembly comprising:

a retaining sleeve attached to the control relay, said retaining sleeve including a through passageway;

a mounting bracket having a first end and a second end, said first end adapted to be secured to the vehicle chassis and said second end extending axially through said retaining sleeve, said second end including retaining clip means; and at least one absorber member received within said retaining sleeve, said at least one absorber having a central passageway;

said second end of said mounting bracket extending through said central passageway of said at least one absorber member and said at least one absorber member seated within said passageway of said retaining sleeve to isolate said retaining sleeve and control relay from said mounting bracket and vehicle chassis, said second end of said mounting bracket extending through said retaining sleeve without engaging said retaining sleeve, said retaining clip means preventing extraction of said mounting bracket from said at least one absorber member.

2. The mounting assembly as defined in claim 1 wherein said retaining sleeve is integrally formed with a relay housing of the control relay.

3. The mounting assembly as defined in claim 1 wherein said mounting bracket includes flange means adapted to engage a first end of said at least one absorber member seated within said retaining sleeve, said retaining clip means engaging a second end of said at least one absorber member seated within said retaining sleeve, said flange means and said retaining clip means cooperating to prevent axial movement of said mounting bracket and absorber members relative to said retaining sleeve.

4. The mounting assembly as defined in claim 3 wherein said retaining clip means comprises a face plate having a slotted opening and bendable tabs formed at the second end of said mounting bracket, said bendable tabs extending through said opening and when bent retaining said face plate against the second end of said at least one absorber member seated within said retaining sleeve to prevent withdrawal of said second end of said mounting bracket through said passageways of said at least one absorber member.

5. The mounting assembly as defined in claim 3 wherein said retaining clip means comprises a face plate having a slotted opening and a resilient flange formed in the second end of said mounting bracket, said resilient flange extending through said opening and retaining said face plate against the second end of said at least one absorber member seated within said retaining sleeve to prevent withdrawal of said second end of said mounting bracket through said passageways of said at least one absorber member.

6. The mounting assembly as defined in claim 3 wherein said retaining clip means comprises a face plate having a slotted opening and a pair of resilient fingers formed in the second end of said mounting bracket, said resilient fingers being forced inwardly towards each other as said second end of said bracket is passed through said slotted opening, said resilient fingers including shoulders adapted to retain said face plate against the second end of said at least one absorber member seated within said retaining sleeve to prevent withdrawal of said second end of said mounting bracket through said passageways of said at least one absorber member.

7. The mounting assembly as defined in claim 3 wherein said at least one absorber member includes a retaining lip formed proximate the second end of said at least one absorber member and adapted to extend below said retaining sleeve to prevent axial displacement of said absorber member within said sleeve.

8. The mounting assembly as defined in claim 3 wherein said retaining sleeve includes an inner wall dividing said passageway into a first and a second chamber, said dividing wall having an opening for receiving said mounting bracket such that said second end of said bracket extends through said passageway of said retaining sleeve.

9. The mounting assembly as defined in claim 8 wherein a pair of absorber members having a central passageway are received within said retaining sleeve, one of said absorber members seated within said first retaining sleeve chamber and the other of said absorber members seated within said second retaining sleeve chamber, said inner dividing wall disposed between said absorber members to prevent axial movement of said absorber members, said second end of said mounting bracket extending through said central passageways of said absorber members and said opening of said dividing wall.

10. The mounting assembly as defined in claim 9 wherein said flange means of said mounting bracket engages the outer end of said absorber member seated within said first retaining sleeve chamber, said retaining clip means engaging the outer end of said absorber member seated within said second retaining sleeve chamber, said flange means and said retaining clip means cooperating with said dividing wall to prevent axial movement of said mounting bracket and absorber members relative to said retaining sleeve.

11. An assembly for mounting a control relay to a vehicle chassis in sound isolation from the vehicle chassis, said assembly comprising:

a relay housing having an integrally formed retaining sleeve with a through passageway;

a mounting bracket having a first end and a second end, said first bracket end adapted to be secured to the vehicle chassis and said second bracket end extending through said retaining sleeve;

an absorber member having a central passageway adapted to receive said mounting bracket, said absorber member and mounting bracket seated within said retaining sleeve;

said first bracket end including abutment flange means adapted to engage the first end of said absorber member and said second end of said mounting bracket including retaining clip means adapted to engage the second end of said absorber member, said abutment flange means and said retaining clip means cooperating to prevent axial movement of said mounting bracket relative to said absorber member and axial movement of said absorber member relative to said retaining sleeve;

wherein said absorber member prevents contact between said mounting bracket and said retaining sleeve to isolate said relay housing from the vehicle chassis.

12. The mounting assembly as defined in claim 11 wherein said absorber member includes a retaining lip formed proximate said second end of said absorber member, said retaining lip engaging the end of said retaining sleeve to prevent axial displacement of said absorber member.

13. The mounting assembly as defined in claim 12 wherein said retaining clip means comprises a face plate having a slotted opening and bendable tabs formed at the second end of said mounting bracket, said bendable tabs extending through said slotted opening and when bent retaining said face plate against said second end of said absorber member to prevent withdrawal of said second end of said mounting bracket through said passageway of said absorber member.

14. The mounting assembly as defined in claim 12 wherein said retaining clip means comprises a face plate having a slotted opening and a resilient flange formed in the second end of said mounting bracket, said resilient flange extending through said opening and retaining said face plate against the second end of said absorber member to prevent withdrawal of said second end of said mounting bracket through said passageway of said absorber member.

15. The mounting assembly as defined in claim 12 wherein said retaining clip means comprises a face plate having a slotted opening and a pair of resilient fingers formed in the second end of said mounting bracket, said resilient fingers being forced inwardly towards each other as said second end of said bracket is passed through said opening in said face plate, said resilient fingers including shoulders adapted to retain said face plate against said second end of said absorber member to prevent withdrawal of said second end of said mounting bracket through said passageway of said absorber member.

16. An assembly for mounting a control relay to a vehicle chassis in sound isolation from the vehicle chassis, said assembly comprising:
   a relay housing having an integrally formed retaining sleeve with a through passageway, said retaining sleeve including an inner dividing wall dividing said passageway into an upper chamber and a lower chamber, said inner dividing wall having a central slotted opening;
   a mounting bracket having a first end and a second end, said first end adapted to be secured to the vehicle chassis and said second end extending through said retaining sleeve;
   a pair of absorber members having a central passageway, a first absorber member seated within said upper chamber of said retaining sleeve and a second absorber member seated within said lower chamber of said retaining sleeve wherein said dividing wall is disposed between said absorber members, said central passageways of said absorber members axially aligned with said slotted opening of said dividing wall, said second end of said mounting bracket extending through said central passageways of said absorber members and said opening of said dividing wall;
   said first end of said mounting bracket including abutment flange means adapted to engage the outer end of said first absorber member and said second end of said mounting bracket including retaining clip means adapted to engage the outer end of said second absorber member, said abutment flange means and said retaining clip means cooperating with said dividing wall of said retaining sleeve to prevent axial movement of said mounting bracket relative to said absorber members and axial movement of said absorber members relative to said retaining sleeve;
   wherein said absorber members prevent contact between said mounting bracket and said retaining sleeve to isolate said relay housing from the vehicle chassis.

17. The mounting assembly as defined in claim 16 wherein said retaining clip means comprises a face plate having a slotted opening and bendable tabs formed at the second end of said mounting bracket, said bendable tabs extending through said opening and when bent retaining said face plate against said outer end of said second absorber member to prevent withdrawal of said second end of said mounting bracket through said passageways of said absorber members.

18. The mounting assembly as defined in claim 16 wherein said retaining clip means comprises a face plate having a slotted opening and a resilient flange formed in the second end of said mounting bracket, said resilient flange extending through said opening and retaining said face plate against said outer end of said second absorber member to prevent withdrawal of said second end of said mounting bracket through said passageways of said absorber members.

19. The mounting assembly as defined in claim 16 wherein said retaining clip means comprises a face plate having a slotted opening and a pair of resilient fingers formed in the second end of said mounting bracket, said resilient fingers being forced inwardly towards each other as said second end of said bracket is passed through said opening in said face plate, said resilient fingers including shoulders adapted to retain said face plate against said outer end of said second absorber member to prevent withdrawal of said second end of said mounting bracket through said passageways of said absorber members.

* * * * *